(12) United States Patent
Kadri

(10) Patent No.: US 7,644,060 B2
(45) Date of Patent: Jan. 5, 2010

(54) ARTIFICIAL PSYCHOLOGY DIALOG PLAYER WITH AGING SIMULATION

(76) Inventor: Faisal L. Kadri, 40 Rosedale Avenue, Dollard Des Ormeaux, QC (CA) H9G 1E1

(*) Notice: Subject to any disclaimer, the term of this patent is extended or adjusted under 35 U.S.C. 154(b) by 417 days.

(21) Appl. No.: 11/557,013

(22) Filed: Nov. 6, 2006

(65) Prior Publication Data

US 2008/0177685 A1    Jul. 24, 2008

(51) Int. Cl.
*G06F 15/00*    (2006.01)
(52) U.S. Cl. .............................. 706/62; 706/11; 706/45; 706/46; 704/1; 704/4; 704/9
(58) Field of Classification Search ................. 706/11, 706/14, 45–48, 51–58; 715/700, 701, 707; 704/1, 4, 9, 200
See application file for complete search history.

(56) References Cited

U.S. PATENT DOCUMENTS

| 5,367,454 | A | * | 11/1994 | Kawamoto et al. | 715/706 |
| 5,696,981 | A | * | 12/1997 | Shovers | 704/10 |
| 5,732,232 | A | * | 3/1998 | Brush et al. | 715/751 |
| 5,987,415 | A | | 11/1999 | Breese et al. | |
| 6,587,846 | B1 | * | 7/2003 | LaMuth | 706/21 |
| 6,604,094 | B1 | * | 8/2003 | Harris | 706/48 |
| 6,901,390 | B2 | | 5/2005 | Mizokawa | |
| 7,333,969 | B2 | | 2/2008 | Lee et al. | |
| 7,340,393 | B2 | * | 3/2008 | Mitsuyoshi | 704/207 |
| 2005/0010415 | A1 | | 1/2005 | Hagen | |
| 2007/0033005 | A1 | * | 2/2007 | Cristo et al. | 704/9 |
| 2007/0038436 | A1 | * | 2/2007 | Cristo et al. | 704/9 |

OTHER PUBLICATIONS

George and Mary Professional Edition, www.artificialpsychology. com, 2005 as retrieved from the Wayback Machine (www.web. archive.org), pp. 1-11.*
Boole, G., "An Investigation of the Laws of Thought on which are Founded the Mathematical Theories of Logic and Probabilities", Dover Publication, 1931, cover page and pp. 399-424.
Brain, P. F., "Multidisciplinary Approaches to Aggression Research", Elsevier/North Holland Biomedical Press, 1981, pp. 53-78.

(Continued)

*Primary Examiner*—David R Vincent
*Assistant Examiner*—Omar F Fernandez Rivas
(74) *Attorney, Agent, or Firm*—James J. Paige; Nikolai & Mersereau, P.A.

(57) ABSTRACT

Embodiments of the present invention provide for a computer program of a dialog player. An artificial psychology dialog player is a software program that picks a sentence line from a repertoire according to probabilistic rules and artificial personality states. The personality for the purpose of this invention optimally has four motivational dimensions, one of which is paired with the remaining three; each pair is identified with a stage of human age. The user of the dialog player selects or identifies an age value; the software uses this value in order to determine a set of probabilities of activation for the three stages. The simulation of aging is implemented by automatically activating one of the stages according to these probabilities whenever the personality is prompted for a sentence.

6 Claims, 3 Drawing Sheets

Example of relative probability curves of three stages of aging.

OTHER PUBLICATIONS

Kadri, F. L., "A Dynamic Point of View on Psychology and Values", (in Arabic, self published), ISBN 977-205-024-2, Cairo, Egypt 1988, cover page, pp. 7-9 and back page.

Kadri, F. L., "Animal Drives in Humans; A Cybernetic Model of Normal Human Behavior", ISBN 0-9694181-0-8, (Self published) Trycode, Windsor, Ontario, Canada 1990, cover page, pp. 122-133 and back page.

Kadri, F. L., "Analysis of a Volterra System with Priming Properties", General Systems Approaches to Alternative Economics and Values, vol. 1, International Society for the Systems Sciences, Proceedings of the Thirty-Sixth Annual Meeting, Denver, Colorado, Jul. 12-17, 1992, pp. 523-531.

Kadri, F. L., "Multiplier Feedback: Analysis of a Quasi Homeostatic Model", General Systems Approaches to Alternative Economics and Values, vol. 1, International Society for the Systems Sciences, Proceedings of the Thirty-Sixth Annual Meeting, Denver, Colorado, Jul. 12-17, 1992, pp. 149-157.

Kadri, F. L. and Duncan, I. J. H., "A New Nonlinear Model of Mechanisms of Motivation", Behavioural Processes, 1995, vol. 33, pp. 273-288.

Martin, R. A., Puhlik-Doris, P., Larsen, G., Gray, J., and Weir, K., "Individual differences in uses of humor and their relation to psychological well-being: Development of the Humor Styles Questionnaire", Journal of Research in Personality, 2003, 37, pp. 48-75.

Mark, Ruth, "What is Aggression: Aggressive Behavior", http://www.essortment.com/all/whatisagress_rxeo.htm, Pagewise, 2002, three pages.

* cited by examiner

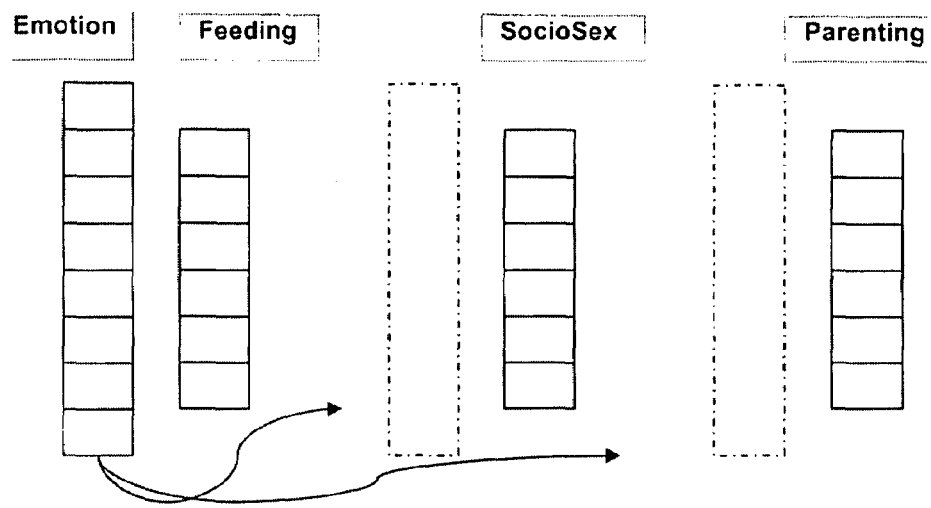
Fig. 1 Pairing of the drives in order to form three stages of aging.
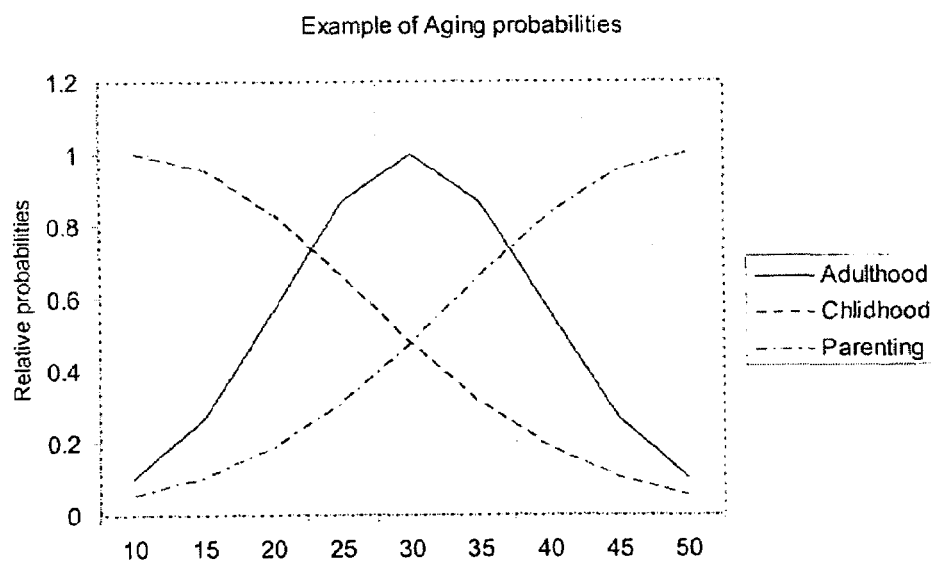
Fig. 2 Example of relative probability curves of three stages of aging.

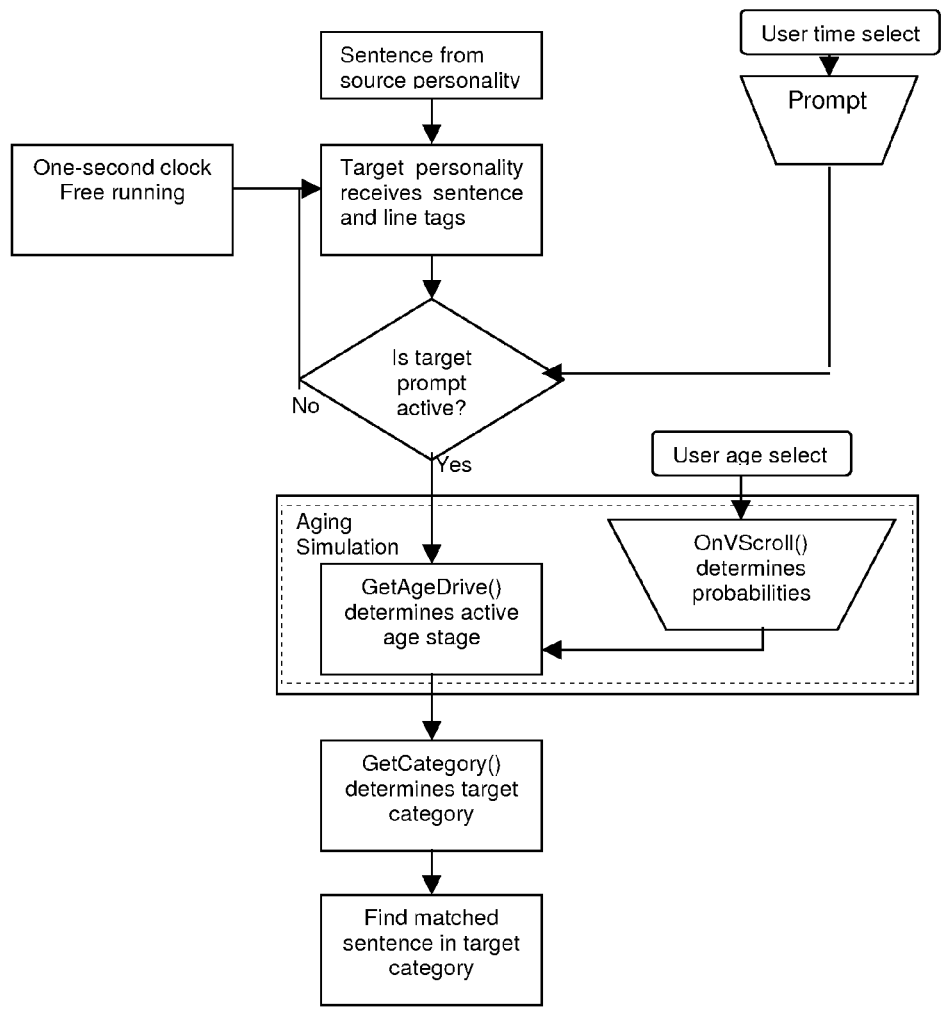
Fig. 3 Flow diagram of the aging simulation part of the implementation.

```
////////////////////////////////////////////////////////////////////////////////
//                                                                            //
//      OnVScroll(UINT nSBCode, UINT nPos, CScrollBar* pScrollBar) is a standard  //
//      MFC function which provides the reading of a scroll bar slider. The parent //
//      function CAgeSet is called when the Age button is pressed in order to select //
//      a numerical value for the age of the personality in years between 10 and 50. //
//                                                                            //
//////////////////////////////////////////////////////////////////////////////// void CAgeSet::OnVScroll(UINT nSBCode, UINT nPos, CScrollBar* pScrollBar)
{
        if (nSBCode== SB_THUMBPOSITION) { // Get slider reading integer
        m_iage.Format("%1d", nPos);

double fuz = (double) nPos; // Converts integer slider reading to double format
        double x1 = (fuz - 10.00000)*0.04125 ;// 10 years offset for 5% residual Normal st
        x1 = exp(-x1*x1);         //         Finding residual for first age stage
        double x2 = (fuz - 30.00000)*0.0825 ;// 30 Years offset for 10% residual Normal Dist
        x2 = exp(-x2*x2);         //         Finding residual for second stage
        double x3 = (50.00000 - fuz)*0.04125 ; // 50 years offset for 5% residual Normal Dist
        x3 = exp(-x3*x3); // Finding residual for third stage
        gt.ageFuzz[0] = 100*(x1/(x1+x2+x3)) ; // First stage range
        gt.ageFuzz[1] = 100*((x1+x2)/(x1+x2+x3)) ; // Second and third stage range gt.m_age = m_iage ; // Defining new selected age integer
        c_Age.SetWindowText(m_iage); // Displaying age integer };
        CDialog::OnVScroll(nSBCode, nPos, pScrollBar);
}

////////////////////////////////////////////////////////////////////////////////
//                                                                            //
//      GetAgeDrive() call takes no parameters:                               //
//      Called on every sentence prompt                                        //
//      Creates a random number between 0 and 100                              //
//      Compares with ageFuzz[1] and ageFuzz[2] range limits                   //
//      Returns active drive number identifier                                 //
//                                                                            //
//////////////////////////////////////////////////////////////////////////////// short CDG::GetAgeDrive()
{
        short q;
        srand(time(NULL));
        int r = rand() % 100;  //  Pick randomly from 100
        if (r >= gt.ageFuzz[1]) q = 3 ;
        else q = 2 ;
        if (r <= gt.ageFuzz[0]) q = 1 ;
        return q;
}
```

Fig. 4 Example code in C++ of calls referenced in Fig. 3 of age simulation systems.

ARTIFICIAL PSYCHOLOGY DIALOG PLAYER WITH AGING SIMULATION

BACKGROUND OF THE INVENTION

Most of the attention of present day Artificial Intelligence researchers and inventors is focused on cognition; possibly because the presence of strong cognition is what separate humans from animals, or because the subject of animal motivation has some degree of uncertainty surrounding the models of animal behavior.

None of the currently available Artificial Intelligence dialog players mimic aging in a text based dialog player. A well-known prior art is the dialog player ALICE (www.alice.org). ALICE is also known as a chatterbot; a text-based software program that responds in matched sentences to a user's text messages. Apart from being insensitive to the age of the user, it is different in being time independent, cognition oriented and requires the user's input. The question imposing itself is whether aging is a cognitive or motivational phenomenon, the convincing answer to the inventor is; while early childhood development is no doubt largely cognitive, later development from adolescence to old age should be viewed as motivational, and this period is the subject of the invention.

BRIEF SUMMARY OF THE PRESENT INVENTION

The invention is embodied in a computer program of a dialog player. An artificial psychology dialog player is a software program that picks a sentence line from a repertoire according to probabilistic rules and artificial personality states. The personality for the purpose of this invention optimally has four motivational dimensions, one of which is paired with the remaining three; each pair is identified with a stage of human age. The user of the dialog player selects or identifies an age value; the software uses this value in order to determine a set of probabilities of activation for the three stages. The simulation of aging is implemented by automatically activating one of the stages according to these probabilities whenever the personality is prompted for a sentence.

BRIEF DESCRIPTION OF THE DRAWINGS

FIG. 1 illustrates pairing of motivational scales in an embodiment of the present invention.

FIG. 2 illustrates relative probabilities of age stages in an embodiment of the present invention.

FIG. 3 illustrates a high level flow diagram of the implementation of embodiments of the present invention.

FIG. 4 shows example code of the key age simulation calls GetAgeDrive and OnVScroll.

DETAILED DESCRIPTION OF THE PREFERRED EMBODIMENTS

The present invention relates to artificial psychology dialog player. Artificial psychology contrasts with artificial intelligence in its emphasis on modeling human-like motivational, rather than cognitive, processes. The personalities used in the present invention have optimally four motivational dimensions.

The inventor researched the subject of human and animal motivation over the past 20 years, and proposed a novel model of animal and human motivation. The essence of the model is a dynamic reinforcing personality, meaning a personality that chances state with time and reinforces the likelihood of a stronger reaction with repeated stimulation, and has four motivational dimensions or drives. The four drives are optimally identified as the Emotion, Feeding, SocioSex and Parenting.

The invention is embodied in a computer program of a dialog player. An artificial psychology dialog player is a software program that picks a sentence line from a repertoire according to probabilistic rules and artificial personality states. The personality for the purpose of this invention optimally has four motivational dimensions, one of which is paired with the remaining three; each pair is identified with a stage of human age. The user of the dialog player selects or identifies an age value; the software uses this value in order to determine a set of probabilities of activation for the three stages. The simulation of aging is implemented by automatically activating one of the stages according to these probabilities whenever the personality is prompted for a sentence.

The present invention provides a dialog player that selects a sentence line from a repertoire of motivational categories occupying four dimensions. Unlike other dialog processors, chatterbots and natural language based systems that analyze the components of a sentence; the said dialog player has motivational values assigned to each category in a drive, which identifies all belonging sentences. The four motivational dimensions are paired into three age stages as explained in FIG. 1. With reference to FIG. 1, each scale has categories corresponding to degrees of motivational states stretching from feeling insecure at the bottom to elation at the top. A personal state of motivation at any given time is described by the categories of two active scales. The scales are paired in a certain way to reflect a broad stage in aging; the Emotion (primary) and one of the remaining three (secondary). The Emotion when paired with Feeding represents the childhood age stage, when with SocioSex corresponds to adulthood and when with the Parenting scale it reflects the maturity stage of aging. Paired means having significant probability of transition between the paired drives and with neighboring categories, optimally implemented by fuzzifying the target category into neighboring and opposite categories of the paired drive. The invention mimics aging by selecting an active stage according to a probabilistic formula such as explained in FIG. 2. With reference to FIG. 2, age transition is a probabilistic mix of all stages of FIG. 1. The probability of being at any one of the three stages depends on the simulated age. If the artificial personality is close to 10 years old then there is high likelihood of being in the childhood stage, and at around 30 the adult stage is most likely to be active, and so on for the mature stage. Note these curves are to illustrate the relative probabilities only, they are not normalized on the graph (they do not add up to one) but in the software implementation of the invention they actually do. The age of the two personalities can be selected between 10 and 50 years, the personalities respond by adjusting the probabilities of active drives, which can be observed by the changing colors of active graphs.

The invention can be run on different platforms: on a personal computer for the use of an individual or family, on a web site for public access, on an advertising billboard or screen, on a sales terminal or on a purpose-built computing platform, it can be useful in customizing a meaningful message to the age of the user and/or the observer. The message can have commercial and/or marketing and/or entertainment purposes. The invention can also be useful as an educational tool, to identify different personality types from observing a dialog or for the purpose of instructing students or for research. The utility of the invention not limited to the above; other uses and platforms are possible.

Observing a story unfold on a TV screen is a daily occurrence to many people, if the story is particularly interesting then the observer may wish to see it multiple times. A good story can be told through dialog in different ways, the dialog player embodiment of the present invention can generate different versions of a story, or alternative ending or plots, thus the dialog player can attract the audience in more ways than a fixed recording such as in film or video tape. Adding aging to the dialog player can provide valuable focus that cuts across cultural barriers; types of humor, aggression, jargon and other topics can be easily focused to the audience's age, thus providing more relevance and effectiveness as a tool for commerce, marketing, entertainment or education.

The repertoire of sentences has a simple, flexible structure. The four drives have categories of magnitude: the Emotion drive has eight categories; three negative, four positive and one zero category. The remaining drives, namely Feeding, SocioSex and Parenting drives have six categories each; two negative, three positive and one zero drive. The number of categories is not critical although the relative count of categories should optimally be higher in the Emotion. Each category is saved in a file in the host computer's memory. In the implementation, the category file is structured as text lines with three fields in each line. The first line contains the total line count in the category. The second on to the last line contain the address flags in the first field including a numerical identifier, alphabetical topic identifier and one graphics switch. The second field contains the sentence, the third has link information and multimedia file path, details are generally not critical to the functioning of the invention.

The personalities are dynamic and reinforcing; dynamic means the personality's internal states vary with time, starting from a drive category near an extreme value, the state of the personality eventually decays to a quiescent value, which may or may not be at the zero category. Reinforcing means the prompts reinforce each time they occurs, the faster they repeat the stronger the reinforcement, which may be positive or negative in value. The reinforcement parameter in the included embodiment is constant for simplicity and for historical reason; the personality model was intended to demonstrate motivation as distinct from cognition, having a constant reinforcement simulates a personality that is indifferent to the cognitive content of the sentences, thus it is only sensitive to the motivational content of dialog. Cognition can be added to the dialog player by making the value of reinforcement dependent on the content of the sentences.

The personalities emphasize motivation rather than cognition, but there is one cognitive distinction that is implemented in the invention, namely internalizing vs. externalizing the drives. For example, aggression is seen as externalized fear, both aggression and fear share the same motivational categories and have the same ultimate purpose of reducing a threat; aggression seeks to neutralize the threat externally while fear seeks to save the integrity of the self from being compromised by the threat, hence internalizing. All drive categories have internalizing-externalizing sub-divisions, in the present implementation there are two personalities; George's and Mary's, George always externalizes the drives while Mary always internalizes. In future implementations the personalities will not be limited to two and the choices can be selected as a choice mix of internalizing and externalizing sentences.

Context behavior exists in many systems that mimic human dialog; if a particular context is active, such as greetings or humor or pets, the next dialog sentence is likely to be part of the same context. In the present implementation, contexts are called topics, one of their functions is to narrow the search for a matching response from a large repertoire of possible responses. Topics are external contexts and are objective; on their own they do not reflect the internal states of the personality. Motivation or the drives on the other hand describe internal contexts and are subjective; their categories define the possible internal states of the personality. One of their functions is to narrow the search for a matching response by excluding categories beyond the neighborhood of the target category. As far as the inventor found, prior art relating to dialog players did not have distinct personalities or defined internal contexts.

There are numerous motivational models of human and animal behavior; none of them is fully tested. The basic personality model used in this implementation, excluding the simulated aging system and method subject of this invention, is the one suggested by the inventor in 1987 and in 1989, both references are part of cited prior art. The motivational model of personality used for this invention is not fully tested nor validated.

ALICE has similarities with this invention in being text based and matches sentences. A structural key difference is in the way sentences are linked; ALICE links forward, i.e. a sentence anticipates its response, while this invention links backwards, i.e., the target personality searches for a match after receiving a sentence according to its internal state.

In the course of running the software implementation of this invention the source personality sends a text sentence and its address tags to the target personality, the target personality re-enforces its active drive immediately and waits for a prompt to respond, meanwhile all drive states continue their exponential decay towards their steady state category. Once a prompt for response is activated, either manually by clicking or automatically in free run or in sequence mode, the address tag of the received sentence and the active drive are used to select a sentence response. The first step is to determine a target category, and this is where the invention of aging simulation takes place. There are two parts both of which use Fuzzy Logic or pseudo-random probabilities: The first part is to determine the active age stage using only pre-set probabilities derived from the numerical age value, the purpose of this part is to mimic aging. The second part uses the present active drive information to reactivate a drive and a category from within the age stage. The reactivation is done according to a fuzzyfied table of probabilities, which allows transitions between the primary (the Emotion) and secondary (Feeding, SocioSex or Parenting) drives, and transitions between neighboring categories, the purpose of this part is to mimic simple transitions between neighboring categories in search of wider variety of matched responses. At reaching this stage, we have defined the new target category and the address tags of the source sentence. A matched sentence is sought by reducing the variety in the target category; first by listing all lines with links to the source address, if no match is found then a random choice is selected. Then by excluding lines from different topics if applicable, then lines which repeated recently if applicable. If at the end of any stage no line remained, a random line will be picked. After a target line is picked graphics and multimedia are activated if applicable, and the text of the target line, now becomes the source line, is displayed and the new target personality's active drive is re-enforced.

The approach used by the present invention is unique because it is the only text based dialog player with aging simulation. Other unique features are the use of a motivational model intended to describe the behaviors of humans and animals, and the use of a dynamic personality structure, which covers all the categories in the repertoire of sentences.

All of the unique aspects of this invention as described in are novel. Other novelties include the easy editing features of the implementation, the statistical representation of matched runs and the ability to activate graphical and multimedia files with specific sentences.

Because of its uniqueness, this invention complements rather than replaces other dialog players. This invention can be part of a bigger system that also includes cognitive oriented dialog players resulting in structures with closer behavioral likeness to the real world. In particular, one of the personalities in the implementation of this invention can be supplemented by a cognitive sentence matching mechanism, which will enable it to accept text input from external user and to find a sentence with close meaning from the target repertoire. Furthermore, this personality can have multiple alternate personalities so that it simulates a model of the outside world to the other personality. The new two-personality system in this case will be capable of addressing the user in a way reflecting his/her age, personality and its relationship to the artificial personality of the computer. For example, if the artificial personality is of a middle aged female, the user can be a young son/daughter or a possible spouse or parent, and each time the dialog can change to reflect the changing personality with the model of the outside world.

The invention claimed is:

1. A process to simulate age comprising the steps of:
    storing in a computer memory three pairs of personality dimensions selected from emotion, feeding, sociosex and parenting personality dimensions by pairing one personality dimension with each of the remaining three personality dimensions, said pairs of personality dimensions corresponding to three stages of human life span;
    assigning probabilities of activation with a computer for each of the three stages of human life span from a maximum probability at middle age and decreasing as age increases and decreases;
    determining the probabilities of activation proportionally as an age for an artificial personality is selected by a dialog player user;
    activating one of the three stages using the determined probabilities after the artificial personality's age is inputted; and
    communicating the artificial personality and the dialog player user by any one of text, graphics or multimedia.

2. The process of claim 1, wherein greater than four personality dimensions can be used.

3. The process of claim 1, wherein greater than three pairs of personality dimensions can be created.

4. The process of claim 1, wherein less than four personality dimensions can be used.

5. The process of claim 1, wherein less than three pairs of personality dimensions can be created.

6. A dialog player, comprising:
    a computer memory that stores artificial personality data based on Emotion, Feeding, SocioSexual and Parenting motivational dimensions, where each dimension is orthogonally split into a cognitive dimension;
    a computer processor that stores in the computer memory data representation of sentences and links under categories belonging to the four motivational dimensions, wherein the sentences of the motivational dimensions are correlated with age; and
    selecting sentences by the computer according to a dialog player user's age and personality using the stored memory data representations and represents this to the dialog player as any one of text, audio or video.

* * * * *